(12) United States Patent
Filippini et al.

(10) Patent No.: US 9,837,093 B2
(45) Date of Patent: Dec. 5, 2017

(54) PACKET BASED DELIVERY OF MULTI-CHANNEL AUDIO OVER WIRELESS LINKS

(71) Applicant: Avago Technologies General IP (Singapore) Pte, Ltd., Singapore (SG)

(72) Inventors: Gianluca Filippini, Cremona (IT); James F. Dougherty, Morgan Hill, CA (US); Kelly Brian Coffey, Los Gatos, CA (US); Robert Zopf, Rancho Santa Margarita, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/007,821

(22) Filed: Jan. 27, 2016

(65) Prior Publication Data

US 2017/0125027 A1    May 4, 2017

Related U.S. Application Data

(60) Provisional application No. 62/249,651, filed on Nov. 2, 2015.

(51) Int. Cl.
| | |
|---|---|
| *G10L 19/16* | (2013.01) |
| *G10L 19/018* | (2013.01) |
| *G10L 19/008* | (2013.01) |
| *H04S 7/00* | (2006.01) |
| *H04W 56/00* | (2009.01) |

(52) U.S. Cl.
CPC .......... *G10L 19/167* (2013.01); *G10L 19/008* (2013.01); *G10L 19/018* (2013.01); *H04S 7/30* (2013.01); *H04W 56/001* (2013.01); *H04S 2400/01* (2013.01)

(58) Field of Classification Search
CPC ..... G06F 3/165; H04L 65/60; H04L 65/4069; H04W 56/0015; H04H 20/61; H04H 20/38; H04H 20/88; H04N 9/87
USPC ........................... 455/3.06; 386/357; 381/23
See application file for complete search history.

(56) References Cited

U.S. PATENT DOCUMENTS

| | | | |
|---|---|---|---|
| 6,611,678 B1 * | 8/2003 | Zweig ................... | H03J 1/0075 455/161.3 |
| 2007/0226530 A1 * | 9/2007 | Celinski .................... | G06F 1/12 713/500 |
| 2008/0089268 A1 * | 4/2008 | Kinder .................. | H04L 1/0015 370/315 |
| 2009/0298420 A1 * | 12/2009 | Haartsen ............... | H04J 3/0658 455/3.06 |

(Continued)

*Primary Examiner* — Mohammad Islam
(74) *Attorney, Agent, or Firm* — Sterne, Kessler, Goldstein & Fox P.L.L.C.

(57) ABSTRACT

The present disclosure is directed to systems, apparatuses, and methods for wirelessly delivering multi-channel audio over a packet based network with tight synchronization, high fidelity, and/or low delay as described above. The systems can include a source device that provides multi-channel audio to a distributor device, which wirelessly distributes the multi-channel audio over the packet based network to audio rendering devices, referred to as "sink" devices. The distributor device and the sink devices each include a playback clock that is used to read audio samples of the multi-channel audio from a local memory and drive a digital-to-analog converter (DAC) coupled to a speaker to render the audio samples.

18 Claims, 11 Drawing Sheets

(56) References Cited

U.S. PATENT DOCUMENTS

| | | | | |
|---|---|---|---|---|
| 2010/0316237 A1* | 12/2010 | Elberbaum | .......... | H04M 11/025 381/300 |
| 2012/0058727 A1* | 3/2012 | Cook | ....................... | H04R 5/02 455/41.3 |
| 2012/0070004 A1* | 3/2012 | LaBosco | ................ | H04H 20/30 381/2 |
| 2012/0087503 A1* | 4/2012 | Watson | ................... | H04S 3/008 381/23 |
| 2013/0279888 A1* | 10/2013 | Zeng | ................ | H04N 21/4307 386/357 |
| 2014/0323036 A1* | 10/2014 | Daley | ................... | H04H 20/08 455/3.06 |
| 2016/0350067 A1* | 12/2016 | Sundaresan | ............ | G06F 3/165 |

\* cited by examiner

PACKET BASED DELIVERY OF MULTI-CHANNEL AUDIO OVER WIRELESS LINKS

CROSS REFERENCE TO RELATED APPLICATIONS

The present application claims the benefit of U.S. Provisional Patent Appl. No. 62/249,651, filed Nov. 2, 2015, entitled "Reliable Synchronized Multi-Channel Audio Distribution System over WiFi," which is incorporated herein by reference in its entirety.

FIELD OF THE INVENTION

This application relates generally to the delivery of multi-channel audio, including packet based delivery of multi-channel audio over wireless links.

BACKGROUND

Wireless communication has proliferated over the past decade. One of the more recent areas in which wireless communication has expanded into is multi-channel audio distribution. Multi-channel audio generally refers to audio of a sound scene that was captured from multiple different directions. The captured audio in each direction represents one audio channel in the multi-channel audio. During rendering, each audio channel is sent to a separate speaker positioned within a room to ideally reproduce the audio in a more realistic manner than single-channel audio or multi-channel audio of a lesser degree.

Some of the more common multi-channel audio formats are described using two digits separated by a decimal point (e.g., 2.0, 2.1, 5.1, 6.1, 7.1, etc.). The first digit represents the number of primary audio channels, each of which is to be reproduced on a separate speaker. The second digit represents the presence of a low frequency effect (LFE) audio channel, which is to be reproduced on a subwoofer. To provide some specific examples, a 2.0 multi-channel audio format refers to two primary audio channels (or stereo sound) and no LFE audio channel, whereas a 5.1 multi-channel audio format refers to five primary audio channels and an LFE audio channel.

The clear benefit of wireless multi-channel audio distribution is that it eliminates the need for wires between an audio source and speakers. One existing technology that can be leveraged to wirelessly deliver multi-channel audio is the Institute of Electrical and Electronics Engineers (IEEE) 802.11 family of packet based wireless networks. These "WiFi" networks are ubiquitous, standardized, and can provide a large throughput, making them a good choice for wireless distribution of multi-channel audio. However, wireless distribution of multi-channel audio over such packet-based networks still presents challenges. For such a solution to compete with traditional wired systems, the solution should deliver and playback the multi-channel audio with near equal performance or better. In general, this means the solution should reproduce the multi-channel audio at the speakers with high fidelity, low delay, and perceptually tight synchronization.

Achieving high fidelity generally means zero or near-zero packet loss across the inherently lossy wireless channel. To combat packet loss, application layer forward error correction combined with some packet interleaving can be used. However, these traditional solutions typically fall short of the zero or near-zero packet loss requirement.

Low delay is usually important when the multi-channel audio is to be synced with video. In such an instance, the rendering time of the multi-channel audio with respect to the video generally should be no more than about 100 milliseconds (ms) late or no more than about 25 ms early. The asymmetric nature of this range is a result of the human audio-visual system being accustomed to audio arriving after video due to the speed of sound being slower than the speed of light. This range puts constraints on the amount of packet interleaving that can be applied to combat packet loss mentioned above.

Finally, synchronization across the speakers used to render the multi-channel audio is important because human perception of audio signals is sensitive to delays and phase shifts caused by out-of-sync playback. In general, humans can detect around 10-20 microseconds ($\mu$s) of delay and 1-2 degrees of phase difference between audio signals. At these sensitivities, 48 kHz sampled multi-channel audio (which corresponds to a sample separation of 20.8 $\mu$s) would require synchronization across speakers within one sample period. Thus, it is important to limit the difference in rendering time between speakers, referred to as "cross-jitter". The listener should ideally perceive the combination of audio signals from the different channels as if they were being reproduced by a normal wired system. Too much cross-jitter results in echo and spatialization issues.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
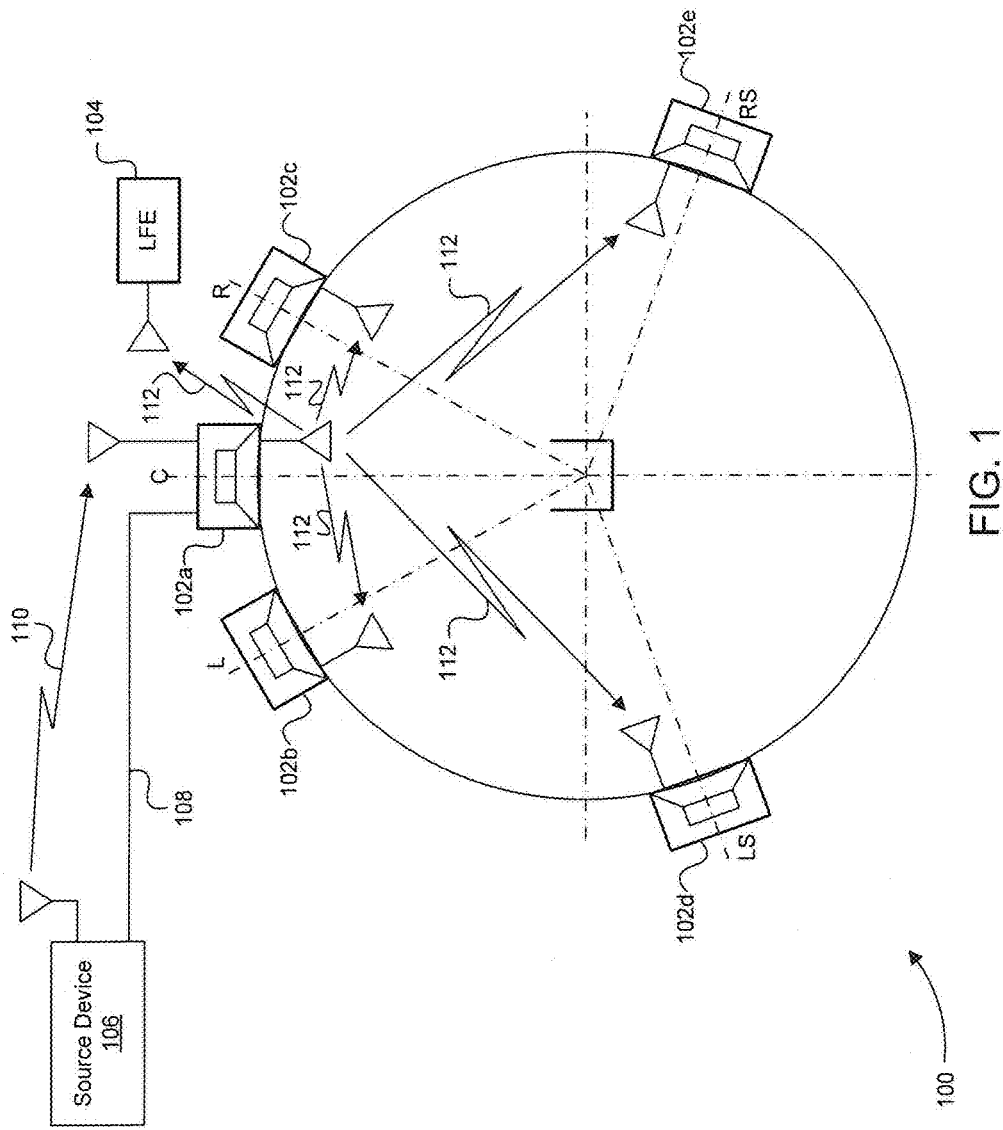
FIG. 1 illustrates an exemplary environment in which embodiments of the present disclosure can operate.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

The present disclosure is directed to systems, apparatuses, and methods for wirelessly delivering multi-channel audio over a packet based network with tight synchronization, high fidelity, and/or low delay as described above. The systems can include a source device that provides multi-channel audio to a distributor device, which wirelessly distributes the multi-channel audio over the packet based network to audio rendering devices, referred to as "sink" devices. The distributor device and the sink devices each include a playback clock that is used to read audio samples of the multi-channel audio from a local memory and drive a digital-to-analog converter (DAC) coupled to a speaker to render the audio samples.

In one embodiment, the playback clocks are not synchronized across the sink devices and the distributor device. Thus, without compensation, the playback clocks will drift relative to each other, resulting in potential echo and spatialization effects. To provide synchronization across the speakers of the sink devices and the distributor device, the distributor device and the sink devices can each include an additional network clock that is synchronized across the devices. The distributor device can then take corresponding samples, or "timestamps", of the playback clock and the network clock at the distributor device and include the timestamps in a packet comprising samples of the multi-channel audio that is wirelessly transmitted to the sink devices for playback. Because the network clocks are synchronized across the devices, the sink devices can use the difference between the two timestamps received in the packet to determine the offset in their respective playback clocks relative to the playback clock at the distributor device and adjust their respective playback clocks to remove such an offset.

To provide high fidelity, embodiments of the present disclosure are configured to "shuffle" audio samples at the distributor device such that temporally contiguous audio samples belonging to an audio channel of a multi-channel audio signal are placed into different packets for wireless transmission to the sink devices. Because the packets contain non-temporally contiguous audio samples, the audio samples of a lost and unrecoverable audio packet can be more easily concealed.

Embodiments of the present disclosure are further configured to provide low-delay when needed or desired. For example, as described above, low delay is usually important when the multi-channel audio is to be synced with video. A modified multicast signaling can be used to wirelessly deliver the multi-channel audio to the sink devices with low-delay. In conventional multicast signaling, such as that used in IEEE 802.11 based wireless networks, the recipient devices do not acknowledge receipt of the multicast transmission, which is undesirable for transmission quality purposes. On the other hand, conventional unicast signaling would require each recipient device to acknowledge receipt of a respective unicast transmission, which increases transmission delay. The modified multicast signaling selects one device among the sink devices as a designated acknowledger for the other sink devices. In this way, the modified multicast transmission can reduce delay while still maintaining a high-level of transmission quality. The sink device designated as the acknowledger is selected based on a characteristic associated with delivering audio from the distributor device to the sink devices.

2. EXEMPLARY OPERATING ENVIRONMENT

Referring now to FIG. 1, an exemplary environment 100 in which embodiments of the present disclosure can operate is illustrated. Exemplary environment 100 shows a 5.1 multi-channel audio system with five speakers 102a-102e and a subwoofer (or LFE) 104. The five speakers and subwoofer 104 are responsible for rendering multi-channel audio provided by a source device 106.

Source device 106 can be, for example, a smartphone, a tablet, a digital set-top-box, an over-the-top media player (e.g., Roku, certain smart TVs and game consoles, Amazon's Fire TV Stick, Google's Chromecast, etc.), or any other device capable of sourcing multi-channel audio content. Source device 106 can provide the multi-channel audio content to one of the speakers 102a-102e or subwoofer 104 for rendering of at least one audio channel and distribution to the remaining ones of speakers 102a-102e and subwoofer 104. In exemplary environment 100, source device 106 provides the multi-channel audio content to center speaker 102a for rendering and further distribution. Because center speaker 102a further distributes the multi-channel audio to the remaining rendering devices or "sink" devices, center speaker 102a is referred to as a "distributor" device. In other embodiments, source device 106 can provide the multi-channel audio to a different or additional one of speakers 102a-102e or subwoofer 104 with distribution capabilities explained further below.

Source device 106 can provide the multi-channel audio to center speaker 102a via wired means 108 and/or wireless means 110. For example, wired means 108 can be a High-Definition Multimedia Interface (HDMI) Audio Return Channel or some other standard or proprietary wired audio output. Wireless means 110 can be, for example, a Bluetooth connection, a WiFi connection, or some other standard or proprietary wireless connection.

Once center speaker 102a receives the multi-channel audio from source device 106, center speaker 102a can process the multi-channel audio. Processing can involve one or more of decompressing the multi-channel audio received from source device 106, buffering samples of the multi-channel audio in a memory, local rendering of the buffered samples of the multi-channel audio that correspond to at least one audio channel (e.g., the center channel), and placing the multi-channel audio into packets for distribution to the remaining speakers 102b-102e and subwoofer 104. In one embodiment, center speaker 102a distributes the packets of multi-channel audio to the remaining speakers 102b-102e and subwoofer 104 via wireless links 112 of a WiFi network or some other standard or proprietary packet-based wireless network.

Wireless distribution of the multi-channel audio over such packet-based networks presents challenges. For such a solution to compete with traditional wired systems, the solution should deliver and playback the multi-channel audio with near equal performance or better. In general, this means the solution should reproduce the multi-channel audio at the speakers with high fidelity, low delay (at least where the multi-channel audio is being synced with video), and perceptually tight synchronization. Embodiments of the present disclosure provide such a solution and are described further below.

3. WIRELESS DISTRIBUTION OF MULTI-CHANNEL AUDIO OVER A PACKET BASED NETWORK

Figure 2:
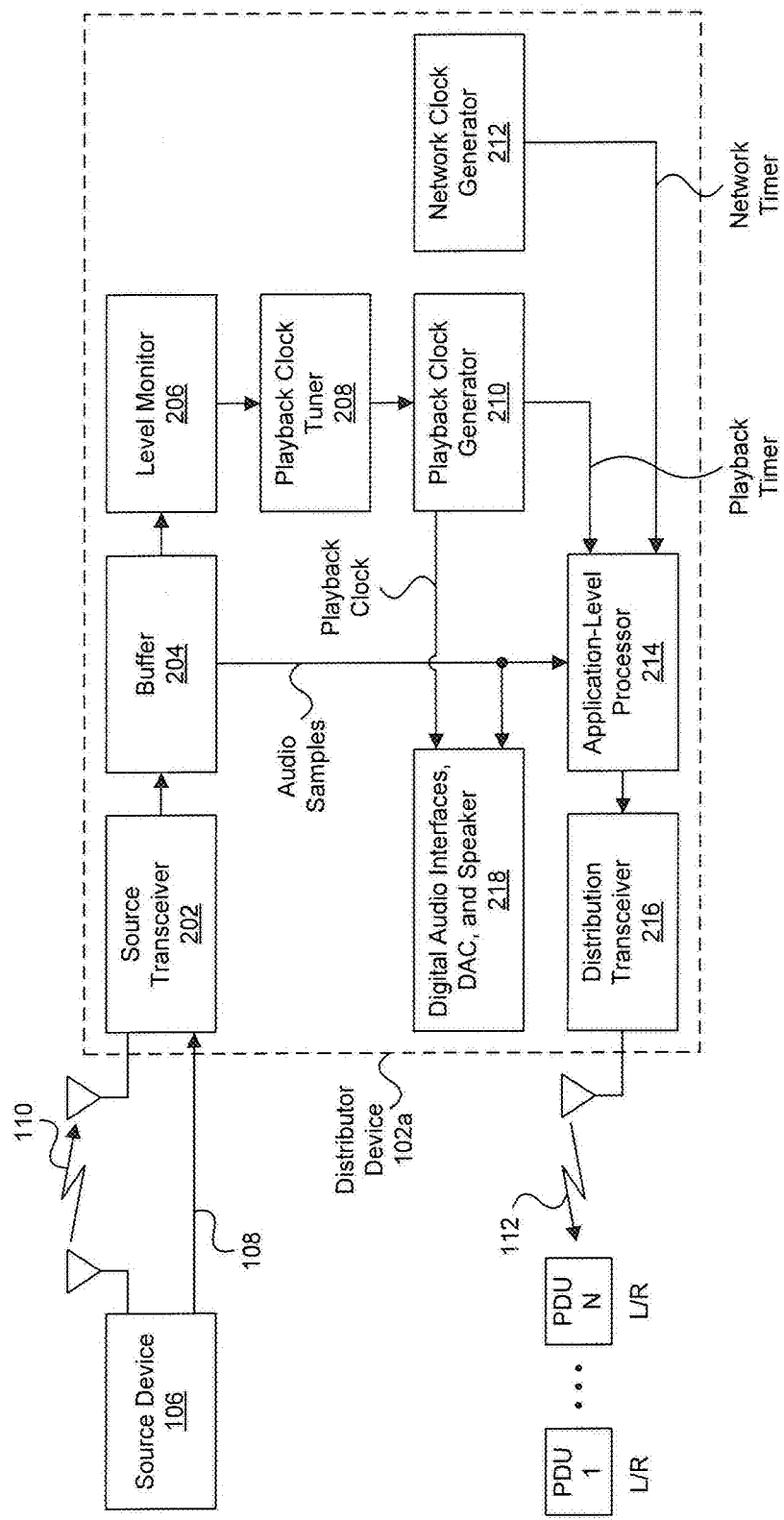
FIG. 2 illustrates an exemplary block diagram of a distributor device in accordance with embodiments of the present disclosure.

FIG. 2 illustrates an exemplary block diagram of a distributor device 102a in accordance with embodiments of the present disclosure. Although described in FIG. 1 as being a center speaker in a 5.1 multi-channel audio system, distributor device 102a is not so limited and can be a different speaker and can be used within a different multi-channel audio system as will be appreciated by one of ordinary skill in the art. As shown in FIG. 2, distributor device 102a includes a source transceiver 202, a buffer 204, a level monitor 206, a playback clock tuner 208, a playback clock generator 210, a network clock generator 212, an application-level processor 214, a distribution transceiver 216, and a block 218 that includes: optional digital audio interfaces, a digital-to-analog converter (DAC), and a speaker that is driven by the DAC.

Source transceiver 202 is configured to receive the multi-channel audio from source device 106 over wired means 108 and/or wireless means 110. For example, as described above, source transceiver 202 can be a Bluetooth transceiver configured to receive the multi-channel audio from source device 106 over wireless means 110. Source transceiver can, if necessary, decompress the multi-channel audio and provide the samples of the multi-channel audio to buffer 204.

Buffer 204 is a memory (e.g., a random access memory) configured to temporarily store the samples of the multi-channel audio received from source transceiver 202. Buffer 204 allows, in part, the source device 106 to provide samples of the multi-channel audio at a rate (or average rate) that is, at least to some extent, different than the rate at which distributor device 102a locally renders or plays back at least one audio channel from the multi-channel audio. In general, the rate at which distributor device 102a locally renders or plays back at least one audio channel from the multi-channel audio is determined based on a playback clock generated by playback clock generator 210. The playback clock generator 210 generates the playback clock based on a sample rate associated with the multi-channel audio. Common audio sample rates include, for example, 48 kHz and 96 kHz.

To prevent buffer 204 from overflowing or under flowing due to the difference in the rate at which source device 106 provides samples of the multi-channel audio to distributor device 102a and the rate at which distributor device 102a renders or plays back at least one audio channel from the multi-channel audio, level monitor 206 can be used to measure the amount of data or audio samples in buffer 204 at specified points in time (e.g., after a certain number of audio samples are locally played back at distributor device 102a). Level monitor 206 can provide the sampled amount to playback clock timer 208 that can use the amount and past amounts (e.g., after having been filtered) to adjust a frequency of the playback clock generated by playback clock generator 210. For example, playback clock generator 210 can include a phase-locked loop (PLL) that is configured to generate the playback clock. This PLL can be adjusted by the playback clock tuner 208 such that the frequency of the playback clock better matches the rate at which source device 106 provides samples of the multi-channel audio to distributor device 102a to prevent overflow or underflow of buffer 204.

The adjusted playback clock generated by playback clock generator 210 is provided to block 218 that includes the optional digital audio interfaces (e.g., Integrated Interchip Sound ($I^2S$) or Sony/Phillips Digital Interface Format (SP-DIF) audio interfaces), a DAC, and a speaker. The optional digital audio interfaces can clock the DAC using the playback clock to convert audio samples of at least one audio channel stored in buffer 204 from the digital domain to the analog domain. The analog signal produced by the DAC can then be used to drive the speaker to produce sound.

Because of the adjustments to the playback clock at distributor device 102a, playback clocks at the other sink devices (e.g., speakers 102b-102e and subwoofer 104 in FIG. 1) need to be adjusted to match. Otherwise, playback of the multi-channel audio across the sink devices will not be synchronized. As noted above, synchronization across the speakers at the sink devices used to render the multi-channel audio is important because human perception of audio signals is sensitive to delays and phase shifts caused by out-of-sync playback. In general, humans can detect around 10-20 microseconds (µs) of delay and 1-2 degrees of phase difference between audio signals. At these sensitivities, 48 kHz sampled multi-channel audio (which corresponds to a sample separation of 20.8 µs) would require synchronization across speakers within one sample period. Thus, it is important to limit the difference in rendering time between speakers, referred to as "cross-jitter". The listener should ideally perceive the combination of audio signals from the different channels as if they were being reproduced by a normal wired system. Too much cross-jitter results in echo and spatialization issues.

To allow for such adjustments to the playback clocks at the sink devices, a network clock generated by network clock generator 212 at distributor device 102a can be synchronized to respective network clocks generated at the sink devices. The network clock at the distributor device 102a and the network clocks at the sink devices can specifically be synchronized with a clock known as the "Grand Master Clock" in accordance with the IEEE 1588/802.1AS standard, which is incorporated herein by reference in its entirety. The Grand Master Clock can be, for example, the network clock at the distributor device 102*a* or a network clock at an access point. It should be noted that the network clock can be synchronized using techniques other than those of the IEEE 1588/802.1AS standard as would be appreciated by one of ordinary skill in the art.

Once the network clocks are synchronized, application-level processor 214 at distributor device 102*a* can take corresponding samples (i.e., samples taken at the same time or based on the same clock), or "timestamps", of the playback clock generated by playback clock generator 210 and the network clock generated by network clock generator 212 and include the timestamps in a packet comprising samples of the multi-channel audio that is wirelessly transmitted to the sink devices for playback. Because the network clocks are synchronized across the devices, the sink devices can use the difference between the two timestamps received in the packet to determine the offset in their respective playback clocks relative to the playback clock at distributor device 102*a* and adjust their respective playback clocks to remove such an offset.

It should be noted that, instead of taking samples or timestamps of the playback clock and network clock directly, samples or timestamps of a playback timer and network timer that are respectively generated based on the playback clock and network clock are used instead as shown in FIG. 2. The timers can be monotonically increasing counters that increase at a rate determined based on the playback clock and network clock, respectively. A sample or timestamp of one of these timers would correspond to the value of the monotonically increasing counter at a given point in time when the sample or timestamp was taken.

Figure 3:
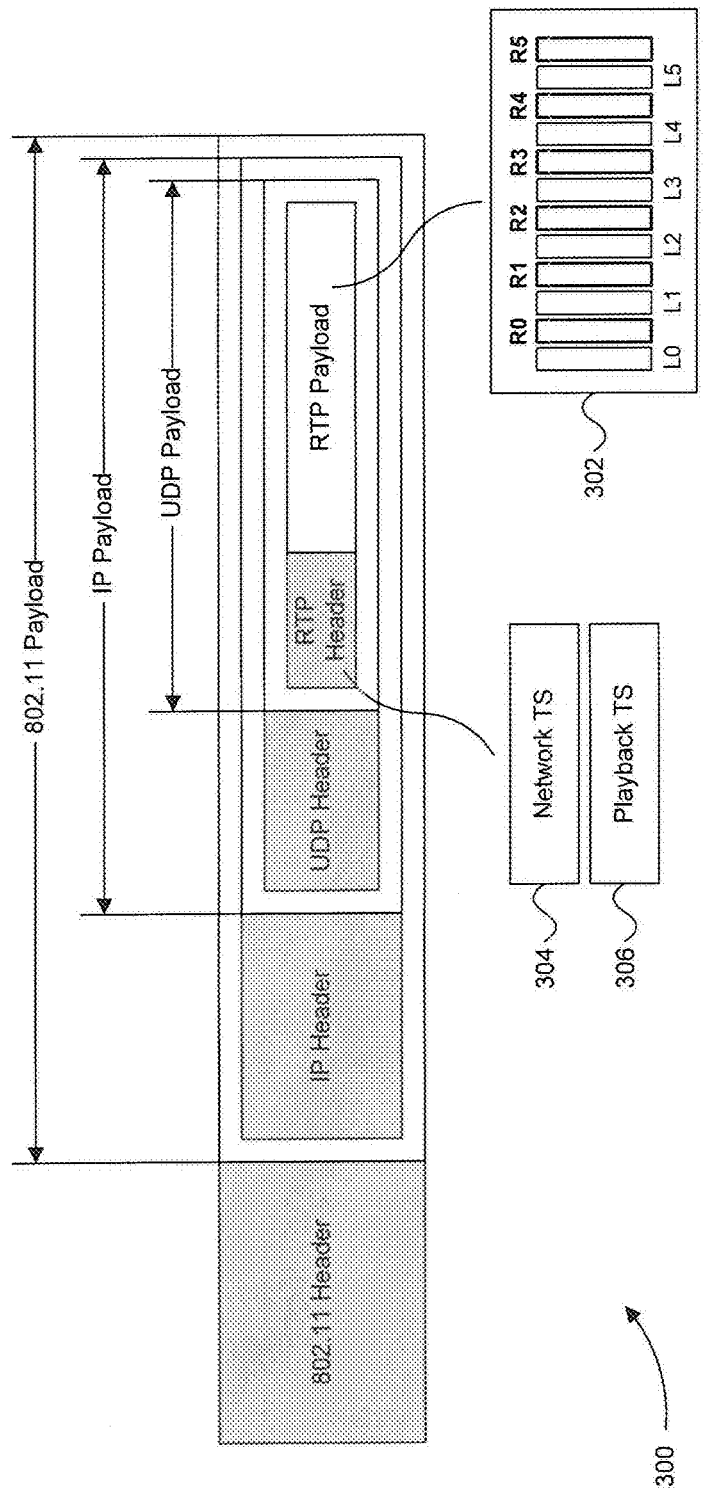
FIG. 3 illustrates an exemplary packet constructed and delivered by a distributor device to sink devices over a wireless network in accordance with embodiments of the present disclosure.

As alluded to above, application processor 214 retrieves samples of the multi-channel audio signal from buffer 204 and places them into packets, along with timestamps of the playback timer and network timer, for transmission to the sink devices by distribution transceiver 216. FIG. 3 illustrates an example of one such packet 300, where the wireless packet-based network over which packet 300 is transmitted is specifically assumed to be a WiFi or IEEE 802.11 packet-based wireless network. However, it will be appreciated by one of ordinary skill in the art that other types of packet-based networks can be used.

As shown in FIG. 3, packet 300 includes several layers of encapsulation. At the lowest layer is the 802.11 packet, which includes an 802.11 header and payload. At the next higher layer, the 802.11 payload encapsulates an Internet Protocol (IP) packet, which includes an IP header and payload. At the next higher layer, the IP payload encapsulates a User Datagram Protocol (UDP) packet, which includes a UDP header and payload. Finally, at the highest layer, the UDP payload encapsulates a Real-Time Protocol (RIP) packet, which includes an RTP header and payload. UDP/RTP is a common transport and application layer protocol combination for delivering delay sensitive data, such as audio or video. However, it will be appreciated by one of ordinary skill in the art that other transport and application layer protocols can be used.

As further shown in FIG. 3, audio samples 302 of the multi-channel audio can be placed into the RTP payload. Specifically, six samples for each of a left and right audio channel are shown in FIG. 3 as being placed in the RTP payload. Depending on the size of the audio samples and number of channels in the multi-channel audio, more or less samples can be included in the RTP payload. In addition to audio samples 302, a network timestamp 304 and playback timestamp 306 as described above in regard to FIG. 2 can be placed within the RTP header. However, in other embodiments, network time stamp 304 and playback timestamp 306 can be placed in the RTP payload or in some other part of packet 300.

Referring back to FIG. 2, application-level processor 214 can be configured to construct the IP/UDP/RTP portion of the 802.11 packet 300, and distribution transceiver 216 can be configured to construct the final 802.11 packet 300 with the IP/UDP/RTP portion encapsulated within the payload of 802.11 packet 300. FIG. 2 illustrates a burst of N such packets (in lower left hand corner) being transmitted over wireless link 112 by distribution transceiver 216, with each packet in the burst comprising exemplary audio samples for two different channels: front left (L) and front right (R).

One issue with wireless link 112 is that it is inherently lossy. As a result, certain ones of the packets in the burst may be lost. To better compete with wired multi-audio distribution solutions, a wireless distribution solution can strive for zero or near-zero packet loss. To combat packet loss, application layer forward error correction combined with some packet interleaving can be used. However, these traditional solutions typically fall short of the zero or near-zero packet loss goal.

Application-level processor 214 can be further configured to "shuffle" audio samples of the multi-channel audio such that temporally contiguous audio samples that belong to an audio channel of the multi-channel audio are placed into different packets for wireless transmission to the sink devices. As will be explained further below, because the packets contain non-temporally contiguous audio samples, the audio samples of a lost and unrecoverable audio packet can be more easily concealed.

Figure 4:
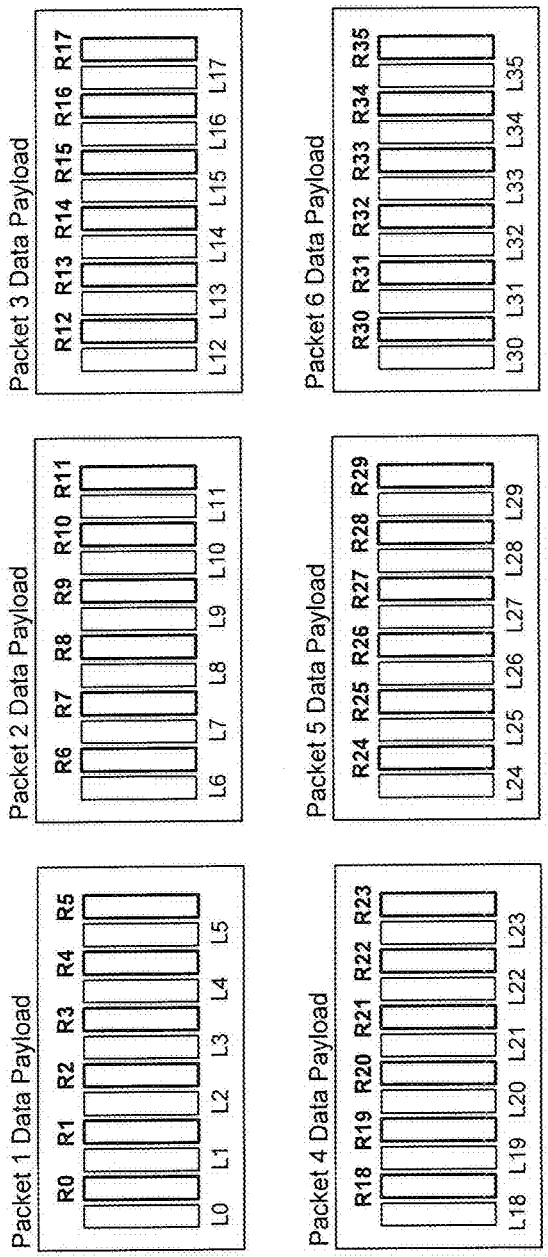
FIG. 4 illustrates exemplary payloads of a burst of packets transmitted over a wireless link by a distributor device in accordance with embodiments of the present disclosure.

FIG. 4 illustrates exemplary payloads 400 of the burst of packets transmitted over wireless link 112 by distribution transceiver 216 shown in FIG. 2. The burst of packets specifically includes six packets, and each of payloads 400 of the six packets includes six temporally contiguous audio samples for a front left (L) and front right (R) audio channel. For example, the payload of packet 1 in FIG. 4 includes the six audio samples R0, R1, R2, R3, R4, and R5 for the R audio channel. These audio samples of the R audio channel were taken at a given audio sample rate, such as 48 kHz or 96 kHz. Thus, R0 and R1 are spaced apart in time by one sample period equal to the inverse of the sample rate associated with the R audio channel. R0 and R2 are spaced apart in time by two such sample periods. R0 and R3 are spaced apart in time by three such sample periods, etc.

In general, when a packet is lost during transmission and cannot be recovered at a sink device using forward error correction or other received redundant data, the audio samples that were carried by the lost packet generally should be concealed during rendering to prevent a listener from noticing or perceiving the missing samples of the lost packet to a large extent. For example, the sink devices can implement a classical audio interpolation concealment technique, such as a "windowed overlap&add" technique or waveform similarity based overlap-add (WSOLA) technique. These techniques rely on the time continuity of audio samples. When a packet is lost, the sink device will have an "audio gap" that can be filled by one of these audio interpolation techniques, and the size of the gap is directly correlated to how well these techniques can conceal the gap, with larger gaps typically being less effectively concealed.

Figure 5:
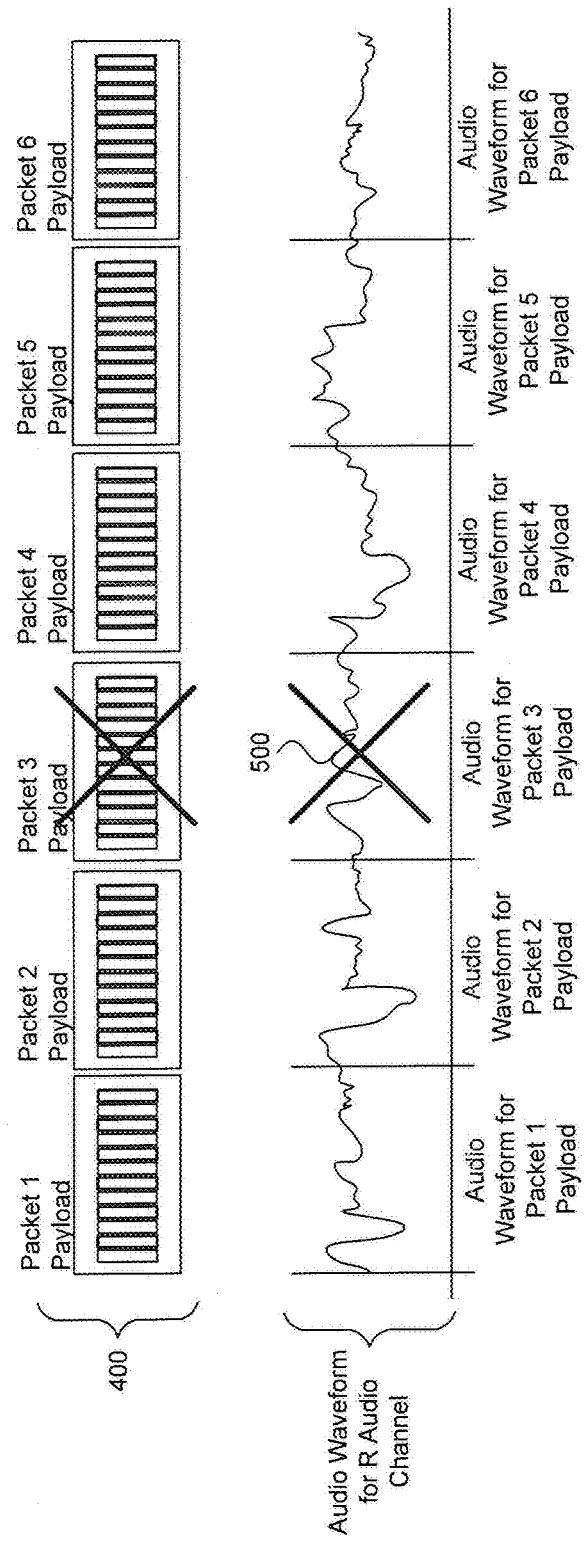
FIG. 5 illustrates exemplary payloads for six packets and an exemplary audio waveform associated with audio samples in the payloads for the six packets in accordance with embodiments of the present disclosure.

FIG. 5 illustrates the six packet payloads 400 from FIG. 4 and, below each payload, the audio waveform associated with the audio samples the respective payload carries for the R audio channel. Because the audio samples in each of payloads 400 for the R audio channel are temporally contiguous, the audio waveforms for each payload are also temporally contiguous as shown. Because of this, if the packet of one of payloads 400 is lost during transmission and unrecoverable at the sink device responsible for rendering the R audio channel, there will be a large gap in the audio of the R audio channel. For example, as shown in FIG. 5, if the packet associated with the third payload is lost during transmission and is unrecoverable at the sink device responsible for rendering the R audio channel, there will be a large gap 500 in the audio of the R audio channel. The gap can be concealed using an audio interpolation technique, such as WSOLA, but because of the size of the gap, the audio interpolation technique may not be highly effective in concealing the gap.

Figure 6:
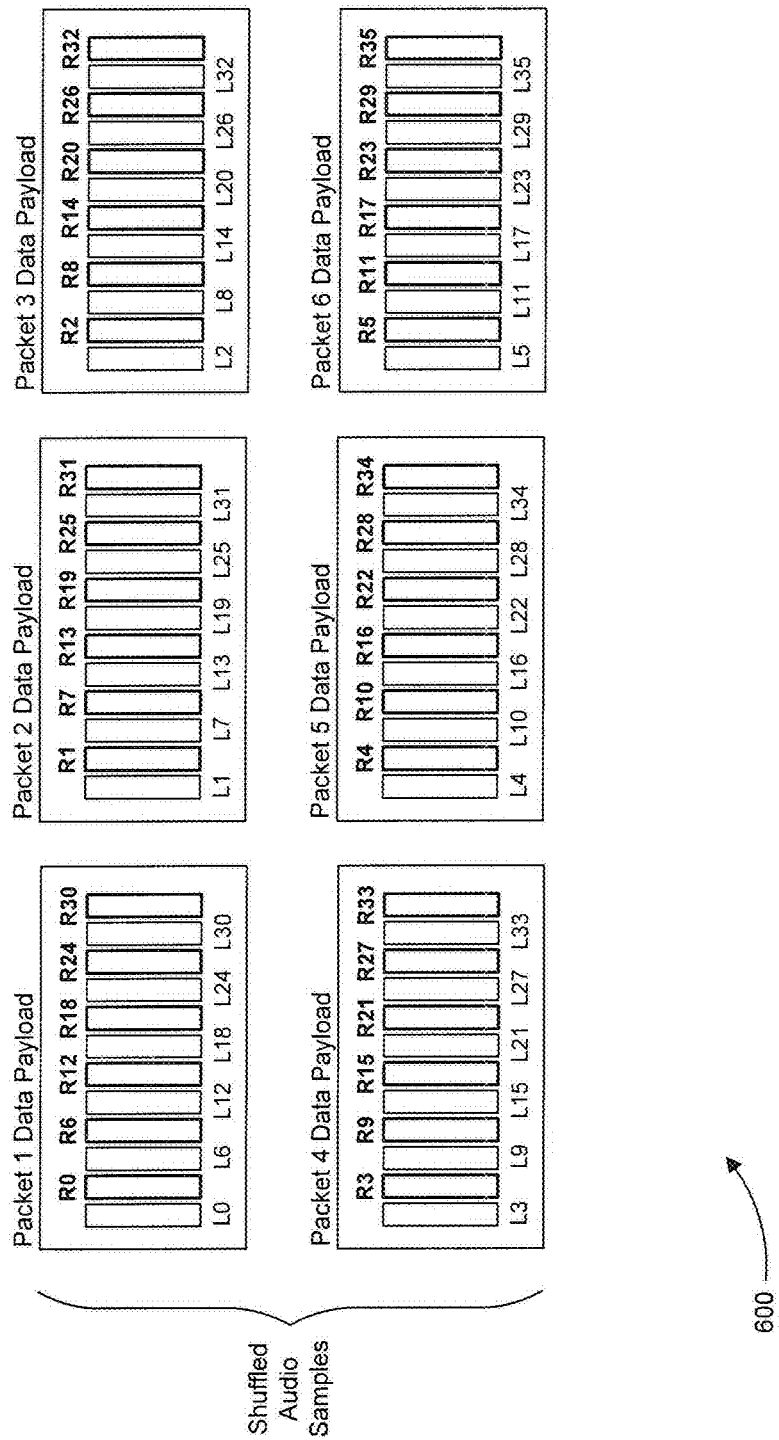
FIG. 6 illustrates exemplary payloads for six packets with the same audio sample content as the payloads in FIG. 4 in accordance with embodiments of the present disclosure.

FIG. 6 illustrates exemplary payloads 600 with the same audio sample content as payloads 400 in FIG. 4. However, the audio samples in payloads 600 have been "shuffled" to specifically mitigate large gaps in the audio waveforms associated with the audio samples due to a lost and unrecoverable packet at a sink device. For example, as shown in FIG. 6, rather than placing temporally contiguous audio samples such as R0 and R1 in the same payload of packet 1, as was the case in the payload of packet 1 in FIG. 4, the audio samples have been shuffled in FIG. 6 such that audio sample R0 is in the payload of packet 1 and audio sample R1 is the payload of packet 2. In fact, in FIG. 6, the audio samples have been shuffled across the packets such that the samples of an audio channel in the payload of a packet are separated by six sample periods. Other sample period separation distances and/or non-symmetrical shuffles can be used as would be appreciated by one of ordinary skill in the art.

Figure 7:
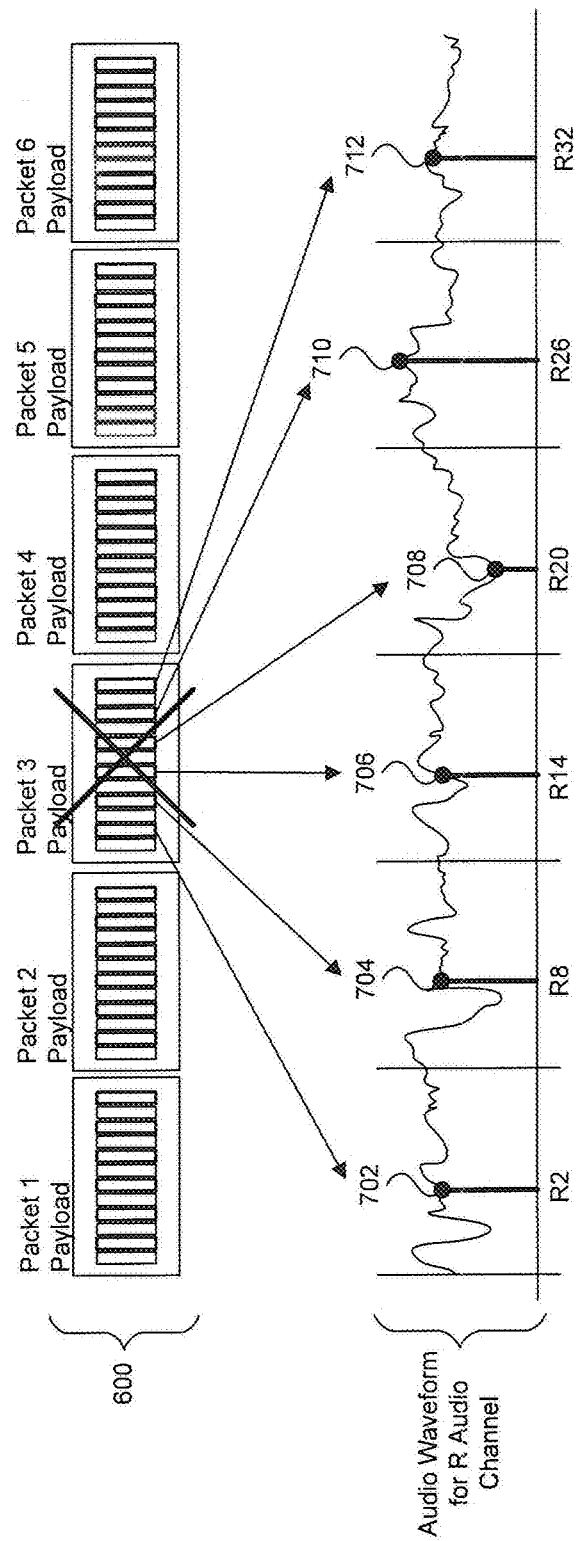
FIG. 7 illustrates exemplary payloads for six packets and an exemplary audio waveform associated with audio samples in the payloads for the six packets in accordance with embodiments of the present disclosure.

FIG. 7 illustrates the six packet payloads 600 from FIG. 6 and below payloads 600 the audio waveform associated with the audio samples for the R audio channel carried by payloads 600. Because the audio samples in each of payloads 600 for the R audio channel are non-temporally contiguous due to shuffling, the associated portions of the R channel audio waveform for each payload are also non-temporally contiguous. For example, this can be seen from the audio samples for the R audio channel in the payload of packet 3 (i.e., samples R2, R8, R14, R20, R26, and R32), which are labeled in FIG. 7. Because of this, if the packet of one of payloads 600 is lost during transmission and is unrecoverable at the sink device responsible for rendering the R audio channel, there will not be as large of a gap in the audio of the R audio channel as was the case for the non-shuffled audio samples.

For example, as shown in FIG. 7, if the packet associated with the third payload is lost during transmission and is unrecoverable at the sink device responsible for rendering the R audio channel, there will be small, one-sample gaps 702-712 in the audio of the R audio channel. Because the gaps are only one-sample wide, the gaps can be effectively concealed using an audio interpolation technique, such as WSOLA.

Referring back to FIG. 2, after the packets have been constructed, distribution transceiver 216 can transmit the packets over wireless link 112 in such a manner to provide low-delay when needed or desired. For example, as described above, low delay is usually important when the multi-channel audio is to be synced with video. Distribution transceiver 216 can implement a modified multicast signaling to wirelessly deliver the multi-channel audio to the sink devices with low-delay.

In conventional multicast signaling, such as that used in IEEE 802.11 based wireless networks, the recipient de ices do not acknowledge receipt of the multicast transmission, which is undesirable for transmission quality purposes. On the other hand, conventional unicast signaling would require each recipient device to acknowledge receipt of a respective unicast transmission, which increases transmission delay. The modified multicast signaling selects one device among the sink de ices as a designated acknowledger for the other sink devices. In this way, the modified multicast transmission can reduce delay while still maintaining a high-level of transmission quality. Distribution transceiver 216 can select the sink device designated as the acknowledger based on a characteristic associated with delivering audio from the distributor device to the sink devices. For example, distribution transceiver 216 can select the sink device with the lowest measure of received signal strength indicator (RSSI) for a signal received from distribution transceiver 216. Further details and variants of the modified multicast signaling that can be implemented by distribution transceiver 216 and the sink devices can be found in U.S. patent application Ser. No 13/220,571, titled "Point to Multi-Point Wireless Video Delivery," which is incorporated herein by reference in its entirety.

Figure 8:
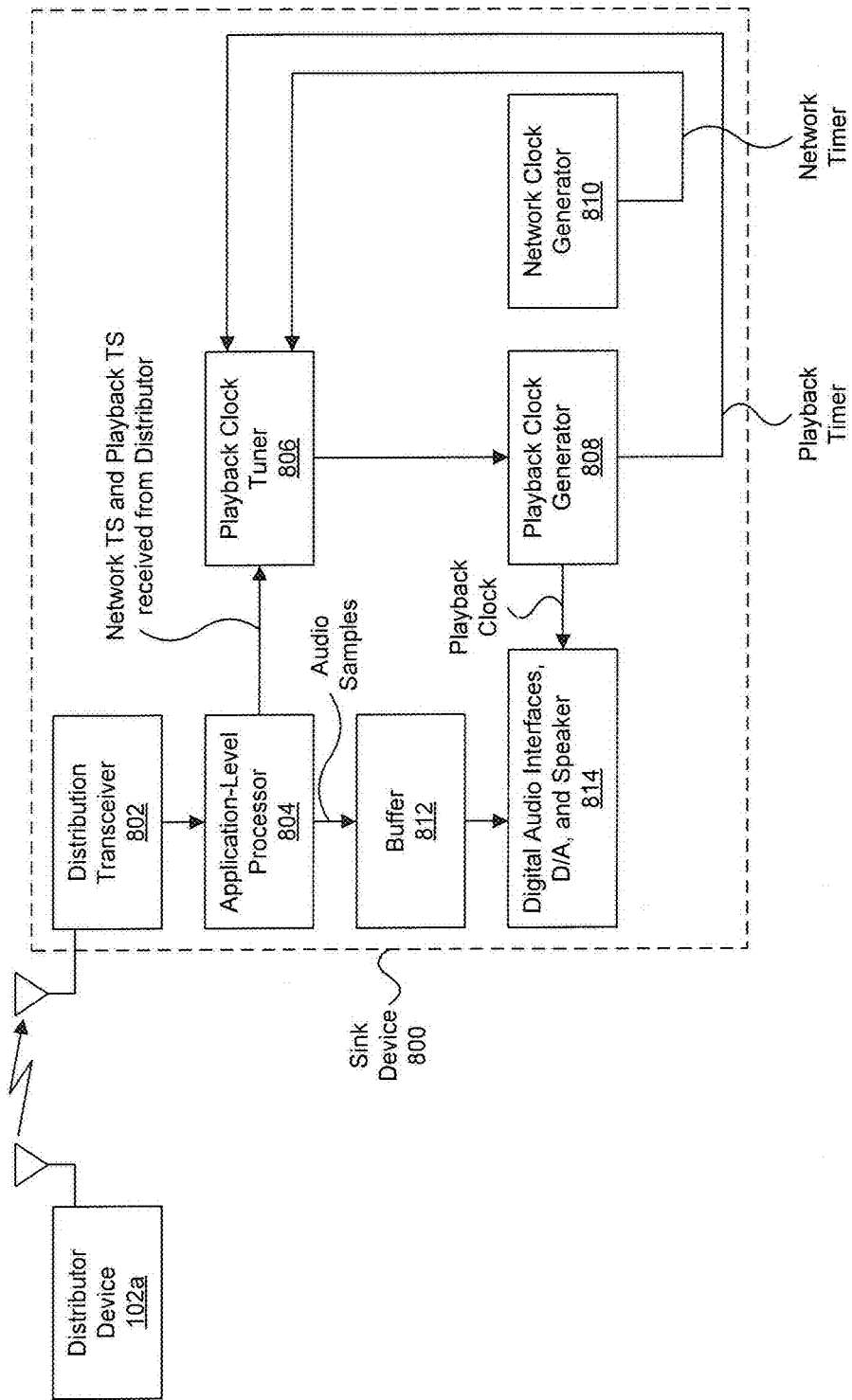
FIG. 8 illustrates an exemplary block diagram of a sink device in accordance with embodiments of the present disclosure.

Referring now to FIG. 8, an exemplary block diagram of a sink device 800 in accordance with embodiments of the present disclosure is illustrated. Sink device 800 can be, for example, one of speakers 102b-102e or subwoofer 104 in FIG. 1. As shown in FIG. 8, sink device 800 includes a distribution transceiver 802, an application-level processor 804, a playback clock tuner 806, a playback clock generator 808, a network clock generator 810, a buffer 812, and a block 814 that includes: optional digital audio interfaces, a digital-to-analog converter (DAC), and a speaker that is driven by the DAC. Playback clock generator 808 is configured to generate a playback clock and, based on the playback clock, a playback timer. Network clock generator 810 is configured to generate a network clock, and based on the network clock, a network clock timer. The network clock and the network clock timer at sink device 800 are synchronized, as described above, to the network clock and network clock tinier at distributor device 102a.

In operation, distribution transceiver 802 is configured to receive multi-channel audio from distribution device 102a over wireless means. For example, distribution transceiver 802 can be an 802.11 or WiFi transceiver and can be configured to implement a modified multicast technique as described above.

After receiving the packets from distributor device 102a, distribution transceiver 802 can acknowledge successful receipt if designated as the designated acknowledger device and provide the packets to application-level process 804. Application level processor 804 can remove the audio samples from the packets and, if necessary, de-shuffle the audio samples in the inverse manner that the audio samples were shuffled at distributor device 102a. Application-level processor 804 can then provide the de-shuffled audio samples, or at least the de-shuffled audio samples that correspond to the audio channel to be rendered at sink device 800, to buffer 812 (e.g., a random access memory) for temporary storage. In addition to removing the audio samples from the packets, application-level processor 804 can remove timestamps of the network timer and playback timer of the distributor device 102a from the packets and provide the timestamps to playback clock tuner 806.

Playback clock tuner 806 can use the difference between the two timestamps received from application-level processor 804 to determine an offset in the playback clock, generated by playback clock generator 808 at sink device 800, from the playback clock at distributor device 102*a*. More specifically, playback clock tuner 806 can compare the difference between the two timestamps received from application-level processor 804 to the difference between samples of its locally generated playback timer and network tinier to determine an offset in the playback clock generated by playback clock generator 808. Playback clock tuner 806 can then adjust playback clock generator 808 to compensate for the offset to synchronize the playback clock at sink device 800 with the playback clock at distributor device 102*a*.

The adjusted playback clock generated by playback clock generator 808 is provided to block 814 that includes the optional digital audio interfaces (e.g., Integrated Interchip Sound (I²S) or Sony/Phillips Digital Interface Format (SP-DIF) audio interfaces), a DAC, and a speaker. The optional digital audio interfaces can clock the DAC using the playback clock to convert samples of at least one audio channel stored in buffer 812 from the digital domain to the analog domain. The analog signal produced by the DAC can then be used to drive the speaker.

Figure 9:
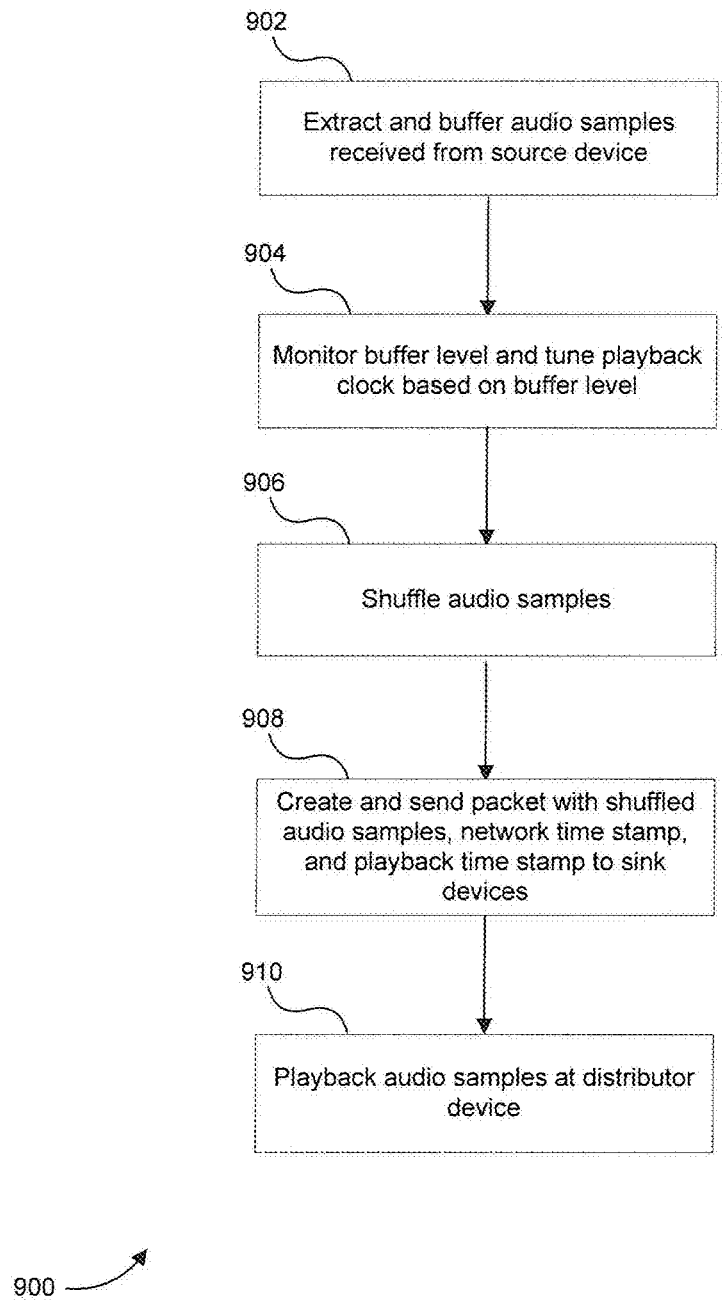
FIG. 9 illustrates a flowchart of an exemplary method for operating a distributor device in accordance with embodiments of the present disclosure.

Referring now to FIG. 9, a flowchart 900 of a method for operating a distributor device in accordance with embodiments of the present disclosure is illustrated. The method of flowchart 900 will be described below in the context of being performed by distributor device 102*a* in FIG. 2. However, one of ordinary skill in the art will appreciate that the method of flowchart 900 is not limited to distributor device 102*a* in FIG. 2. It should be noted that the steps of flowchart 900 do not necessarily occur in the order shown in FIG. 9.

As shown in FIG. 9, the method of flowchart 900 begins at step 902. At step 902, source transceiver 202 extracts multi-channel audio samples from packets received from a source device and buffers the extracted audio samples in buffer 204.

After step 902, the method of flowchart 900 proceeds to step 904. At step 904, level monitor 206 monitors the amount of data or audio samples stored in buffer 204 and provides the monitored level to playback clock tuner 208. Playback clock tuner 208 uses the monitored level and past monitored levels to tune a playback clock generated by playback clock generator 210. For example, playback clock tuner 208 can adjust a PLL in playback clock generator 210 that is used to generate the playback clock. In general, the playback clock is tuned to prevent underflow or overflow of buffer 204.

After step 904, the method of flowchart 900 proceeds to step 906. At step 906, application-level processor 214 is configured to shuffle audio samples read from buffer 204 such that temporally contiguous audio samples belonging to an audio channel of the multi-channel audio signal are placed into different packets for wireless transmission to the sink devices. Because the packets contain non-temporally contiguous audio samples, the audio samples of a lost and unrecoverable audio packet can be more easily concealed.

After step 906, the method of flowchart 900 proceeds to step 908. At step 908, application-level processor 214 and distribution transceiver 216 create and send packets with the shuffled audio samples and timestamps of the network and playback timers to the sink devices.

After step 908, the method of flowchart 900 proceeds to step 910. At step 910, audio samples corresponding to at least one audio channel of the multi-channel audio are read from buffer 204 and played back at distributor device 102*a* based on the playback clock generated at distributor device 102*a*.

Figure 10:
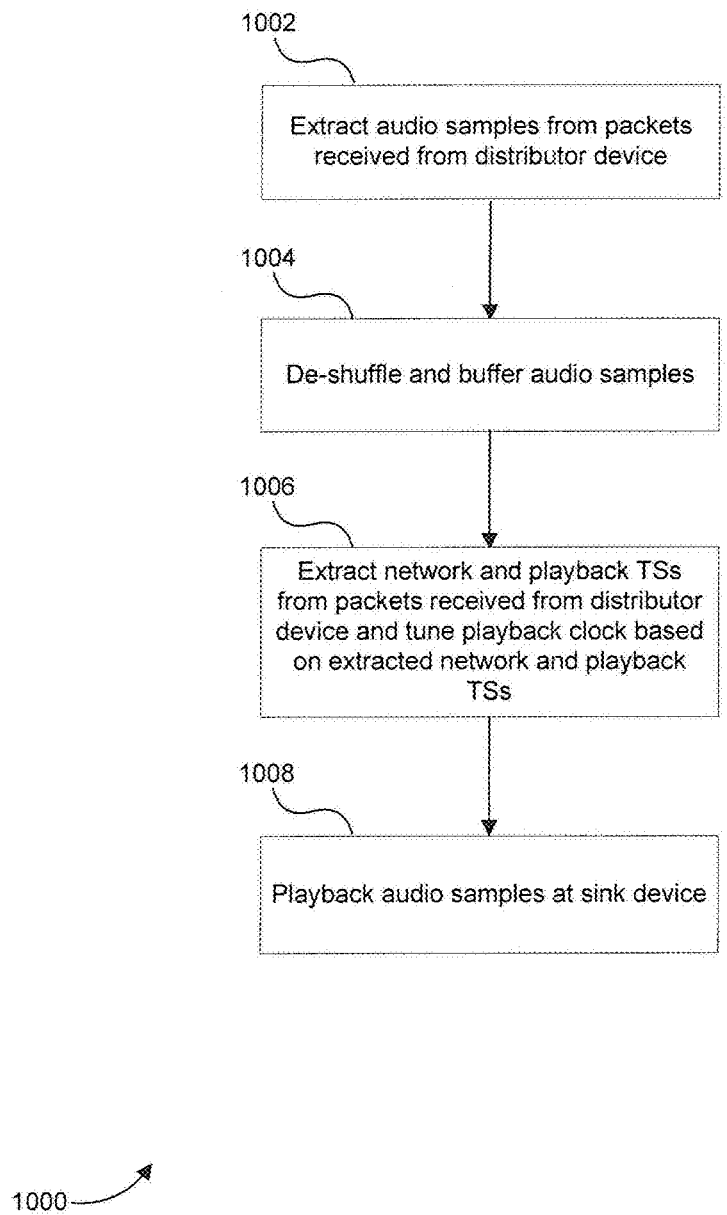
FIG. 10 illustrates a flowchart of an exemplary method for operating a sink device in accordance with embodiments of the present disclosure.

Referring now to FIG. 10, a flowchart 1000 of a method for operating a sink device in accordance with embodiments of the present disclosure is illustrated. The method of flowchart 1000 will be described below in the context of being performed by sink device 800 in FIG. 8. However, one of ordinary skill in the art will appreciate that the method of flowchart 1000 is not limited to sink device 800 in FIG. 8. It should be noted that the steps of flowchart 1000 do not necessarily occur in the order shown in FIG. 10.

As shown in FIG. 10, the method of flowchart 1000 begins at step 1002. At step 1002, distribution transceiver 802 extracts multi-channel audio samples received from a distributor device.

After step 1002, the method of flowchart 1000 proceeds to step 1004. At step 1004, application-level processor 804 de-shuffles the extracted audio samples and stores in them in buffer 812.

After step 1004, the method of flowchart 1000 proceeds to step 1006. At step 1006, distribution transceiver 802 extracts network and playback timestamps received from the distributor device, and playback clock tuner 806 tunes the playback clock generated by playback clock generator 808 based on the extracted timestamps as well as timestamps of the network and playback timers at sink device 800 as described above. The playback clock generated at sink device 800 is specifically tuned to match the playback clock at the distributor device.

After step 1006, the method of flowchart 1000 proceeds to step 1008. At step 1008 audio samples corresponding to at least one audio channel of the multi-channel audio are read from buffer 812 and played back at sink device 800 based on the playback clock generated at sink device 800.

4. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 11:
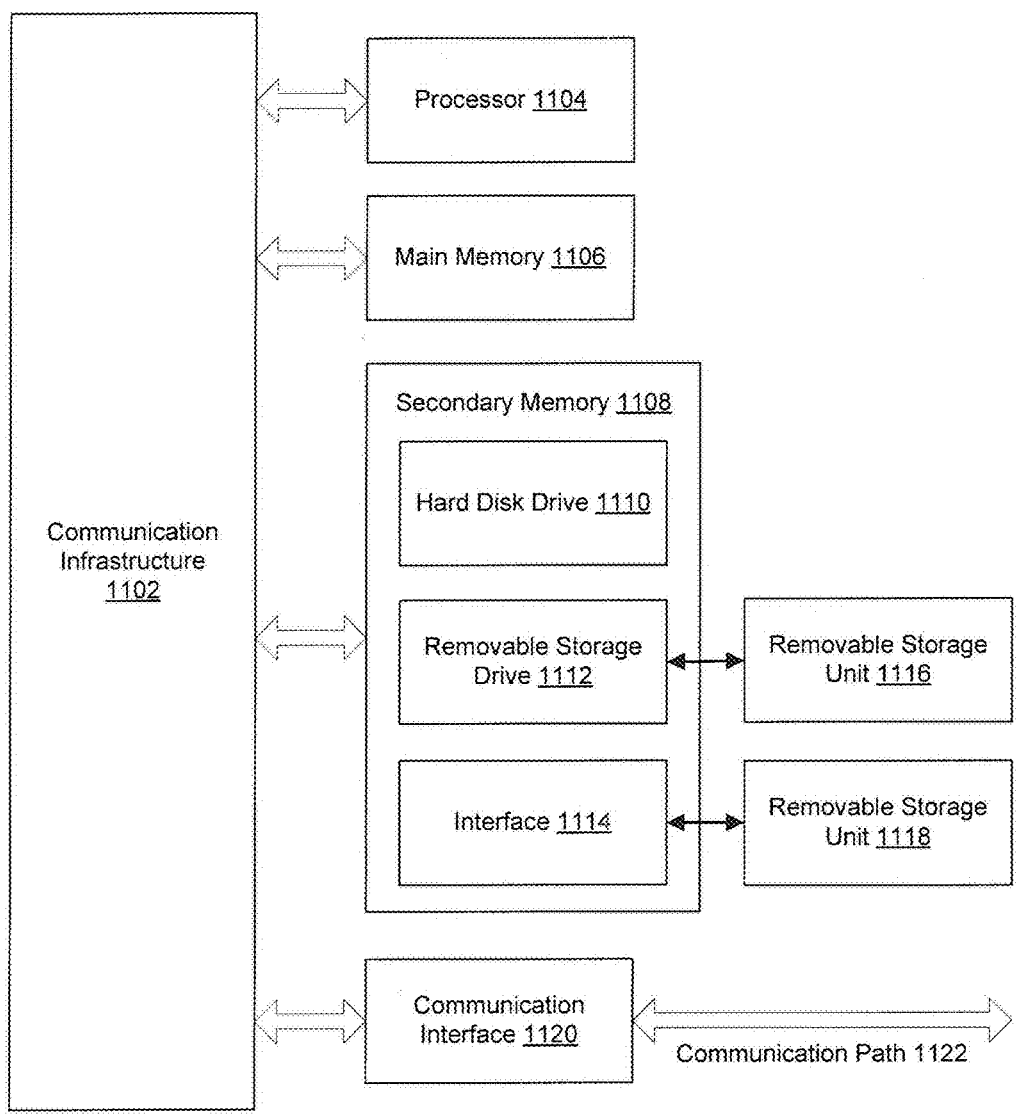
FIG. 11 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1100 is shown in FIG. 11. Blocks depicted in FIGS. 2 and 8 may execute on one or more computer systems 1100. Furthermore, each of the steps of the methods depicted in FIGS. 9 and 10 can be implemented on one or more computer systems 1100.

Computer system 1100 can include one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s)

how to implement the disclosure using other computer systems and/or computer architectures.

Computer system 1100 can also include a main memory 1106, preferably random access memory (RAM), and may also include a secondary memory 1108. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 816 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCMCIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A distributor device comprising:
  a buffer configured to store audio samples received from a source device;
  a network clock generator configured to provide a network timer based on a network clock synchronized with network clocks at sink devices;
  a playback clock generator configured to provide a playback timer based on a playback clock used to playback, at the distributor device, a first portion of audio samples retrieved from the buffer;
  a playback clock tuner configured to tune the playback clock based on an amount of data stored in the buffer; and
  an application-level processor configured to place a sample of the playback timer, a sample of the network timer associated with the sample of the playback timer, and a second portion of the audio samples retrieved from the buffer into a packet for transmission to the sink devices, wherein the application-level processor is further configured to shuffle at least some of the audio samples retrieved from the buffer such that temporally contiguous audio samples in the audio samples retrieved from the buffer are placed into different packets for transmission to the sink devices.

2. The distributor device of claim 1, wherein the application-level processor is further configured to shuffle the at least some of the audio samples retrieved from the buffer such that the second portion of the audio samples includes only non-temporally contiguous audio samples for an audio channel.

3. The distributor device of claim 2, wherein the non-temporally contiguous audio samples for the audio channel are spaced apart in time by two or more sample periods, wherein each of the sample periods corresponds to an inverse of a sample rate associated with the audio samples for the audio channel.

4. The distributor device of claim 2, wherein the non-temporally contiguous audio samples for the audio channel are equally spaced apart in time by two or more sample periods, wherein each of the two or more sample periods corresponds to an inverse of a sample rate associated with the audio samples for the audio channel.

5. The distributor device of claim 1, wherein the network clock is synchronized with the network clocks at the sink devices in accordance with the Institute of Electrical and Electronics Engineers (IEEE) 802.1AS standard.

6. The distributor device of claim 1, further comprising:
a source transceiver configured to receive the audio samples stored in the buffer from the source device, wherein the source transceiver is a Bluetooth transceiver or a High Definition Multimedia Interface (HDMI) transceiver.

7. The distributor device of claim 1, further comprising:
a distribution transceiver configured to transmit the packet to the sink devices, wherein the distribution transceiver is an Institute of Electrical and Electronics Engineers (IEEE) 802.11 wireless local area network transceiver.

8. The distributor device of claim 1, further comprising;
a distribution transceiver configured to transmit the packet to the sink devices using a multicast transmission scheme where one of the sink devices among the sink devices is designated to acknowledge receipt of the packet.

9. The distributor device of claim 8, wherein the distribution transceiver is further configured to identify the one of the sink devices among the sink devices based on a characteristic associated with delivering audio from the distributor device to the sink devices.

10. The distributor device of claim 1, wherein the first portion of the audio samples retrieved from the buffer corresponds to one audio channel and the second portion of the audio samples retrieved from the buffer corresponds to multiple audio channels.

11. A distributor device comprising:
a buffer configured to store audio samples received from a source device;
a playback clock generator configured to provide a playback timer based on a playback clock used to playback, at the distributor device, a first portion of the audio samples retrieved from the buffer;
a playback clock tuner configured to tune the playback clock based on an amount of data stored in the buffer; and
an application-level processor configured to shuffle the audio samples retrieved from the buffer such that a second portion of the audio samples retrieved from the buffer includes only non-temporally contiguous audio samples for an audio channel, wherein the second portion of the audio samples retrieved from the buffer are placed into a packet for transmission to sink devices.

12. The distributor device of claim 11, wherein the non-temporally contiguous audio samples for the audio channel are spaced apart in time by two or more sample periods, wherein each of the two or more sample periods corresponds to an inverse of a sample rate associated with the audio samples for the audio channel.

13. A method comprising:
storing audio samples received from a source device in a buffer;
providing a network timer based on a network clock synchronized with network clocks at sink devices;
providing a playback timer based on a playback clock used to playback a first portion of the audio samples retrieved from the buffer;
tuning the playback clock based on an amount of data stored in the buffer;
placing a sample of the playback timer, a sample of the network timer associated with the sample of the playback timer, and a second portion of the audio samples retrieved from the buffer into a packet for transmission to the sink devices; and
shuffling at least some of the audio samples retrieved from the buffer such that temporally contiguous audio samples in the audio samples retrieved from the buffer are placed into different packets for transmission to the sink devices.

14. The method of claim 13, wherein the shuffling further comprises:
shuffling the at least some of the audio samples retrieved from the buffer such that the second portion of the audio samples includes only non-temporally contiguous audio samples for an audio channel.

15. The method of claim 14, wherein the non-temporally contiguous audio samples for the audio channel are spaced apart in time by two or more sample periods, wherein each of the two or more sample periods corresponds to an inverse of a sample rate associated with the audio samples for the audio channel.

16. The method of claim 14, wherein the non-temporally contiguous audio samples for the audio channel are equally spaced apart in time by two or more sample periods, wherein each of the two or more sample periods corresponds to an inverse of a sample rate associated with the audio samples for the audio channel.

17. The method of claim 13, wherein the network clock is synchronized with the network clocks at the sink devices in accordance with the Institute of Electrical and Electronics Engineers (IEEE) 802.1AS standard.

18. The method of claim 13, further comprising:
transmitting the packet to the sink devices using a multicast transmission scheme where one of the sink devices among the sink devices is designated to acknowledge receipt of the packet.

* * * * *

UNITED STATES PATENT AND TRADEMARK OFFICE
CERTIFICATE OF CORRECTION

PATENT NO. : 9,837,093 B2
APPLICATION NO. : 15/007821
DATED : December 5, 2017
INVENTOR(S) : Filippini et al.

Page 1 of 1

It is certified that error appears in the above-identified patent and that said Letters Patent is hereby corrected as shown below:

In the Specification

In Column 6, Line 19, replace "timer" with --tuner--.

In Column 7, Line 55, replace "(RIP)" with --(RTP)--.

In Column 8, Line 13, replace "(m lower" with --(in lower--.

In Column 10, Line 2, replace "de ices" with --devices--.

In Column 10, Line 9, replace "de ices" with --devices--.

In Column 10, Line 42, replace "tinier" with --timer--.

In Column 11, Line 7, replace "tinier" with --timer--.

Signed and Sealed this
Eleventh Day of June, 2019

Andrei Iancu
*Director of the United States Patent and Trademark Office*